(12) United States Patent
Kyon (10) Patent No.: US 6,422,497 B1
(45) Date of Patent: Jul. 23, 2002

(54) DUAL-BEARING REEL HAVING A DETACHABLE HANDLE

(75) Inventor: KwangHo Kyon, KyongKi-Do (KR)

(73) Assignee: ToYo Engineering Co., Ltd., KyongKi-Do (KR)

( * ) Notice: Subject to any disclaimer, the term of this patent is extended or adjusted under 35 U.S.C. 154(b) by 5 days.

(21) Appl. No.: 09/650,619

(22) Filed: Aug. 30, 2000

(30) Foreign Application Priority Data

Sep. 2, 1999 (KR) .............................................. 99-37979

(51) Int. Cl.$^7$ ................................................ A01K 89/00
(52) U.S. Cl. ...................................... 242/267; 242/302
(58) Field of Search ................................ 242/249, 267, 242/282, 283, 302, 303, 304, 245

(56) References Cited

U.S. PATENT DOCUMENTS

| | | | | |
|---|---|---|---|---|
| 833,430 A | * | 10/1906 | Verrill | 242/267 |
| 3,104,850 A | * | 9/1963 | Wood | 242/267 |
| 4,732,348 A | * | 3/1988 | Young | 242/282 |
| 4,815,676 A | * | 3/1989 | Young | 242/282 |
| 5,285,985 A | * | 2/1994 | Sakaguchi | 242/302 |
| 5,322,240 A | * | 6/1994 | Sato | 242/302 |
| 5,529,255 A | * | 6/1996 | Asano et al. | 242/283 |
| 5,547,141 A | * | 8/1996 | Yeh | 242/282 |
| 5,588,605 A | * | 12/1996 | Yamaguchi | 242/302 |
| 5,996,918 A | * | 12/1999 | Nanbu | 242/267 |

* cited by examiner

Primary Examiner—Emmanuel M. Marcelo
(74) Attorney, Agent, or Firm—Notaro & Michalos P.C.

(57) ABSTRACT

A dual-bearing reel having a detachable handle, in which decomposition and assembly thereof is easy without special tools. The dual-bearing reel has a handle including an opening and a threaded bore, the opening having a plurality of diametrically extending slots. A driving shaft has one end threaded into the threaded bore of the handle. The reel includes a nut for maintaining a plurality of washers in a proper position of the driving shaft; a spring inserted into a first threaded portion of the driving shaft, for generating a biasing force; a drag knob having an opening for receiving the nut, a first groove for contacting with a pin, and a second groove for receiving an angled locking ring; and a handle locking plate positioned on the driving shaft and fixed to the drag knob by the biasing force of the spring, the plate having hole for receiving the pin and a spring. A plurality of the stopping protrusions are inserted into the slot of the handle, and a throughout hole for receiving the driving shaft is provided, whereby a click sound is generated by friction between the first groove and the pin when the drag knob is rotated.

12 Claims, 10 Drawing Sheets

DUAL-BEARING REEL HAVING A DETACHABLE HANDLE

BACKGROUND OF THE INVENTION GROUP

1. Field of the Invention

The present invention relates to a dual-bearing reel called a bait-casting reel, and more particularly to a dual bearing reel having a detachable handle.

2. Description of the Related Art

Referring to the construction of a prior art dual-bearing reel for fishing for engaging a handle to a driving shaft of the reel, a cutout portion and a threaded portion are formed on both sides of the driving shaft, respectively. An opening of the same shape as the cutout portion of the driving shaft is formed on the handle. The driving shaft is inserted into the opening of the handle and is then fastened by a nut. A plate for preventing the nut from rotating is inserted into the handle. A screw then fixes the plate.

The conventional handle detachable structure as described above has several problems, however. That is, since many tools such as a driver and a wrench are required so as to disengage the handle from the driving shaft, removal of the handle is not convenient. Moreover, noise may occur while using such a handle. In addition, when the handle and the driving shaft are disengaged, some parts may be lost. Furthermore, such a structure has poor endurance, low precision, and low yield.

SUMMARY OF THE INVENTION

To resolve the above problems, an object of the present invention is to provide a dual-bearing reel having a detachable handle, in which the handle is easily engaged to or disengaged from a driving shaft without using special tools.

Another object of the present invention is to provide a detachable handle of a dual-bearing reel capable of generating a click sound when a drag knob is rotated.

In one aspect of the present invention, there is provided a dual-bearing reel having a detachable handle, comprising:

- a handle including an opening and a threaded bore, the opening having a plurality of slots diametrically extended;
- a driving shaft having one end threaded into the threaded bore of the handle;
- a nut for maintaining a plurality of washers in a proper position of the driving shaft;
- a spring inserted into a first threaded portion of the driving shaft, for generating a biasing force;
- a drag knob having an opening for receiving the nut, a first groove for contacting with a pin, and a second groove for receiving an angled locking ring; and
- a handle locking plate positioned on the driving shaft and fixed to the drag knob by the biasing force of the spring, the plate having a hole for receiving the pin and a spring, a plurality of the stopping protrusions being inserted into the slot of the handle, and a throughout hole for receiving the driving shaft, whereby a click sound is generated by a friction between the first groove and the pin when the drag knob is rotated.

In another aspect of the present invention, there is provided a dual-bearing reel having a detachable handle comprising:

- a handle including an opening and a threaded bore, the opening having a plurality of slots diametrically extended;
- a driving shaft having one end threaded into the threaded bore of the handle;
- a spring inserted into a first threaded portion of the driving shaft, for generating a biasing force;
- a locking ring having an angled retaining portions, for generating sound by a friction in rotating;
- a drag knob having an opening for receiving a plurality of washer, a first groove for receiving the spring, and a second groove for receiving the angled retaining portion of the locking ring;
- a handle locking plate positioned on the driving shaft and fixed between the drag knob and the handle by the biasing force of the spring, the plate having a groove for receiving the locking ring, a protrusion portion having a cutout portion, a stopping protrusion being inserted into the opening of the handle, and a throughout hole for receiving the driving shaft, whereby a click sound is generated by a friction between the second groove and the angled retaining portion when the drag knob is rotated.

In still another aspect of the present invention, there is provided a dual-bearing reel having a detachable handle comprising:

- a handle including an opening and a threaded bore, the opening having a plurality of slots diametrically extended;
- a driving shaft having one end threaded into the threaded bore of the handle;
- a nut for maintaining a plurality of washers in a proper position of the driving shaft;
- a spring inserted into a first threaded portion of the driving shaft, for generating a biasing force;
- a drag knob having an opening for receiving the nut, a first groove for receiving a pin and a second spring, and a concave groove for receiving an angled locking ring;
- a handle locking plate positioned on the driving shaft and fixed to the drag knob by the biasing force of the spring, the plate having a hole for contacting with the pin and a plurality of the stopping protrusions being inserted into the opening of the handle, and a throughout hole for receiving the driving shaft, whereby a click sound is generated by a friction between the hole and the pin when the drag knob is rotated.

In still another aspect of the present invention, there is provided a dual-bearing reel having a detachable handle, comprising:

- a handle including an opening and a threaded bore, the opening having a plurality of slots diametrically extended;
- a driving shaft having one end threaded into the threaded bore of the handle;
- a nut for maintaining a plurality of washers in a proper position of the driving shaft;
- a spring inserted into a first threaded portion of the driving shaft, for generating a biasing force;
- a locking ring having an angled retaining portion for generating sound in rotating;
- a drag knob having an opening for receiving the nut, a first groove for contacting with the angled retaining portion, and a second groove for receiving an angled locking ring;
- a handle locking plate positioned on the driving shaft and fixed between the drag knob and the handle by the biasing force of the spring, the plate having a protrusion for supporting the locking ring, a cutout portion for exposing the angled retaining portion of the locking ring, and a throughout hole for receiving the driving shaft, whereby a click sound is generated by a friction between the first groove and the angled retaining portion when the drag knob is rotated.

The dual-bearing reel having a detachable handle comprises a washer-typed nut engaged to a second threaded portion of the driving shaft, for preventing components of the drag knob from being separated when the handle is disengaged from the driving shaft.

The dual-bearing reel having a detachable handle comprises a snap ring engaged to a second threaded portion of the driving shaft, for preventing components of the drag knob from being separated when the handle is disengaged from the driving shaft.

Other objects, features and advantages of the present invention will become apparent to those skilled in the art from the following detailed description. It is to be understood, however, that the detailed description and specific examples, while indicating preferred embodiments of the present invention are given by way of illustration and not limitation.

Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENT

A dual-bearing reel called 'bait-casting reel' having a detachable handle according to the present invention will now be explained with reference to FIG. 1 to 6.

Figure 1:
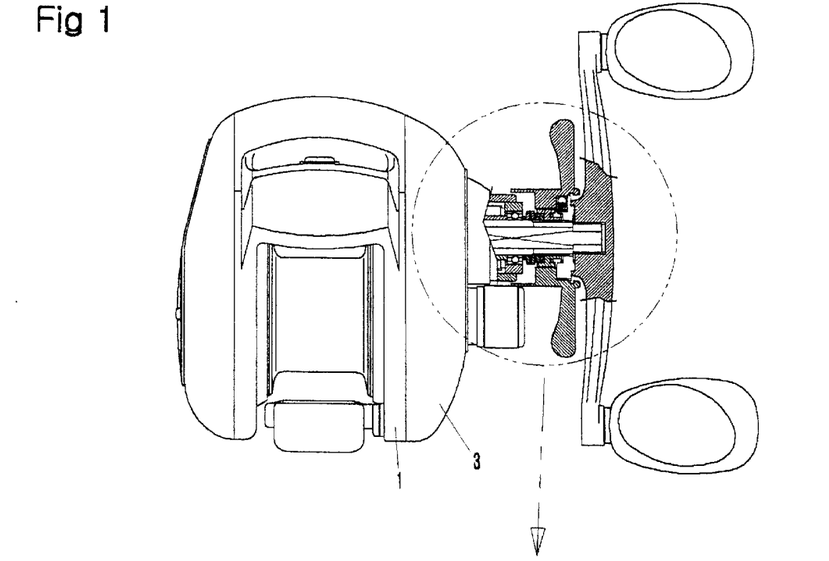
FIG. 1 is a cross-sectional view illustrating a dual-bearing reel having a detachable handle according to a preferred embodiment of the present invention.
Figure 1A:
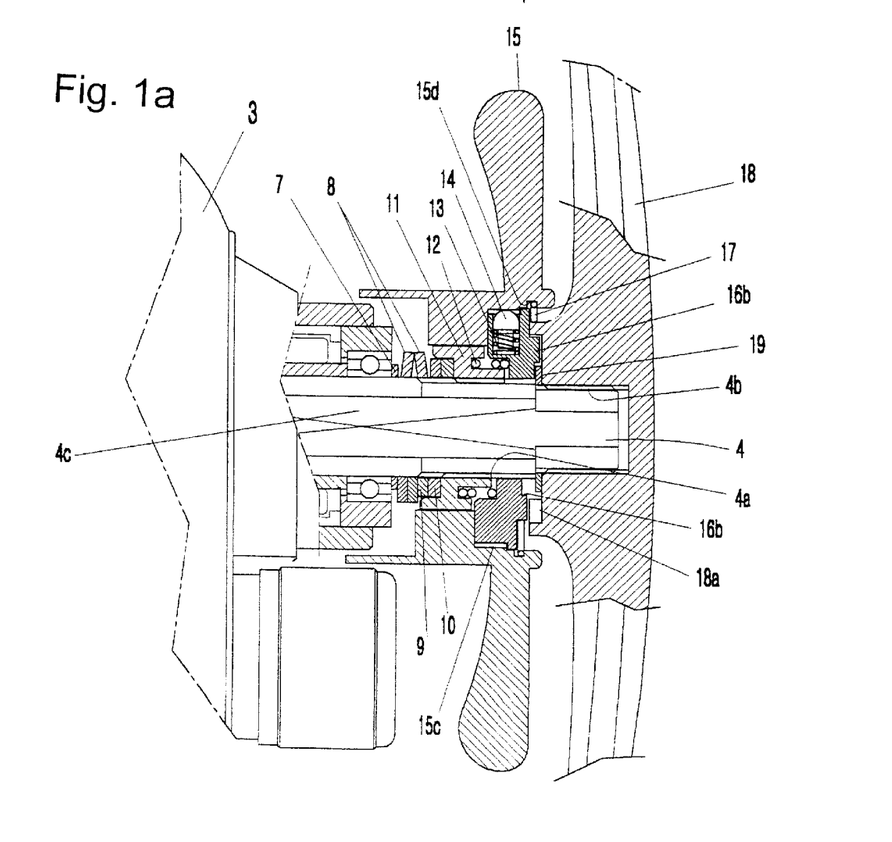
FIG. 1a is an enlarged circled area from FIG. 1.
Figure 2:
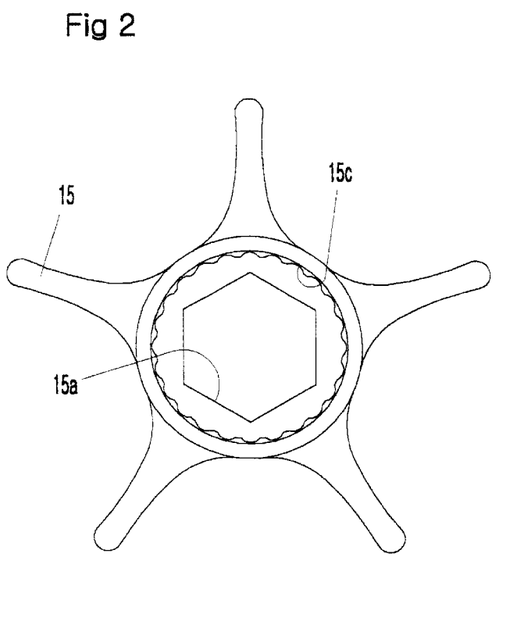
FIG. 2 is a front view illustrating a drag knob according to the present invention.
Figure 3:
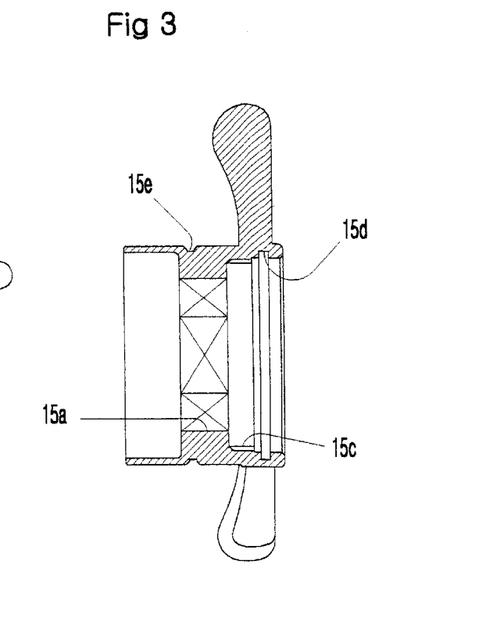
FIG. 3 is a longitudinal cross-sectional view of FIG. 4.
Figure 4:
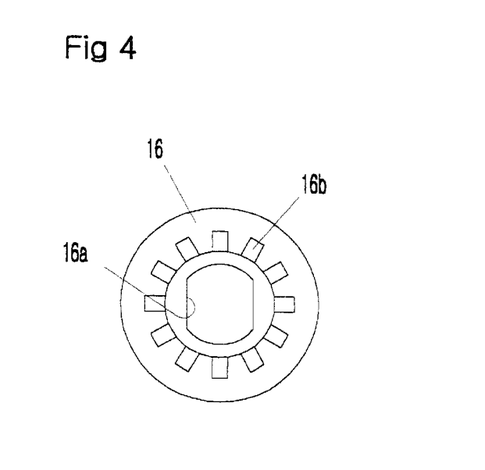
FIG. 4 is a front view illustrating a handle locking plate according to the present invention.

Referring to FIG. 1a, a plurality of plate-shaped springs 8 and a plurality of washers 9 and 10 are inserted onto a driving shaft 4 in order to engage the driving shaft 4 with a handle 18. A nut 11 is then positioned on a threaded portion 4a of the driving shaft 4. A spring 12 is inserted into the threaded portion of the driving shaft 4.

Figure 5:
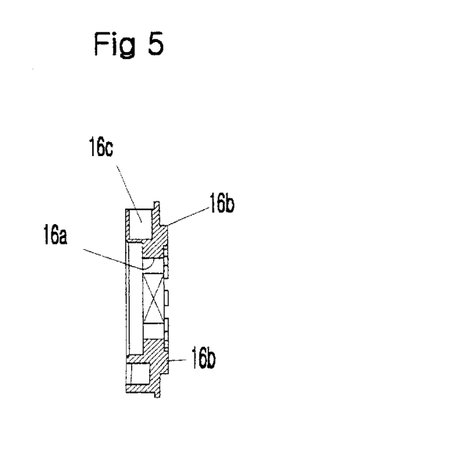
FIG. 5 is a longitudinal cross-sectional view of FIG. 4.
Figure 6:
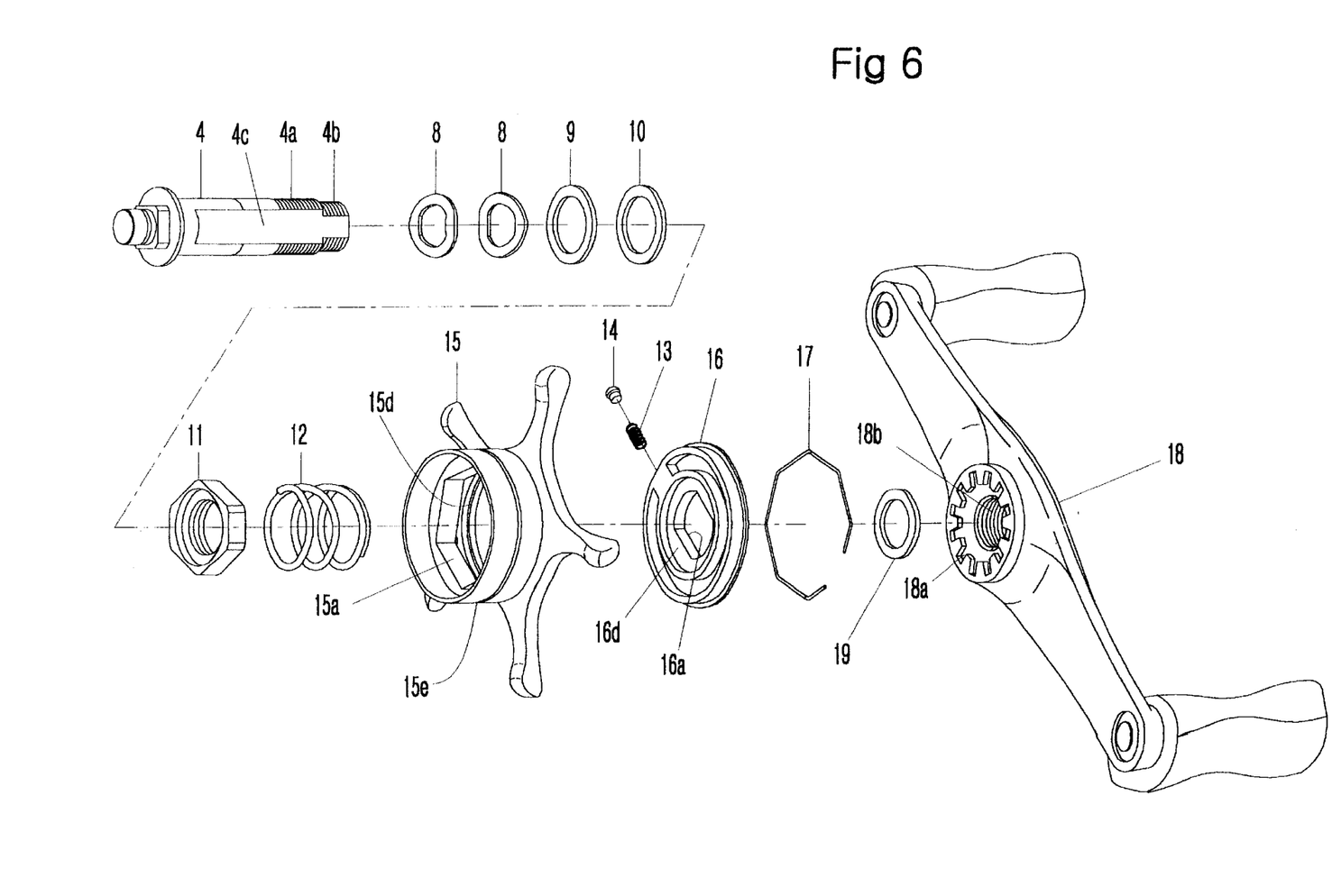
FIG. 6 is an exploded view illustrating the structure of a dual-bearing reel having a detachable handle according to the present invention.

Meanwhile, and as also shown in FIG. 5, a spring 13 and a pin 14 are inserted into a hole 16c of a handle locking plate 16. The driving shaft 4 is inserted into a threaded bore 18b of the handle 18 through a throughout hole 16a of the handle locking plate 16. The driving shaft 4 is also fixed to the handle 18 by an angled locking ring 17 inserted into a concave groove 15d of a drag knob 15. At this time, an end portion of the pin 14 is contacted to a concave groove 15c of the drag knob 15 by biasing force generated from the spring 13. The spring 11 has to be inserted into the nut 12 before the handle locking plate 16 is engaged, so that the biasing force of the spring 12 is applied to the handle locking plate 16.

The drag knob 15 is fixedly fastened after a washer 19 is inserted into the driving shaft 4. One side of the drag knob 15 is pushed in a right direction by using one hand and the threaded portion 4b of the driving shaft 4 is engaged to the threaded bore 18b of the handle 18 by using the other hand.

When a pressure is removed in such state that the threaded portion 4b is fixedly fastened to the handle 18, the handle locking plate 16 is adhere closely to the handle 18 and a plurality of protrusion portion 16b formed diametrically are inserted into the opening 18a of the handle 18 by the biasing force generated from the spring 12.

In this status, since the handle locking plate 16 is moved to only straight direction by engagement with a cutout portion 4c of the driving shaft, the handle 18 is fixed to the driving shaft 4. Subsequently, the drag knob 15 is properly loosened from the nut 11.

When the handle 18 is disengaged from the driving shaft 4, the nut 11 is fixedly fastened by the rotation of the drag knob 15 and a plurality of protrusion portions 16b of the handle locking plate 16, which is formed diametrically, is removed from a plurality of slots of the opening 18a of the handle 18.

At this time, the handle 18 is easily disengaged from the driving shaft 4 by the reverse rotation of the handle 18. Meanwhile, since method of engaging and disengaging of the handle 18 is like other embodiment of the present invention, further explanation will thus be omitted.

According to the present invention described above, the operation of engaging and disengaging of the handle 18 to the driving shaft 4 is possible without using any tools. Also, the groove 15c is moved by a friction of the pin 14 when the drag knob 15 is rotated. That is, the end portion of the pin 14 inserted into the hole 16c of the handle locking plate 16 is contact with the groove 15c. Since the biasing force is applied to the end portion of the pin 14, a click sound is generated due to the friction between the groove 15c and the pin 14 when the drag knob 15 is rotated.

Figure 7:
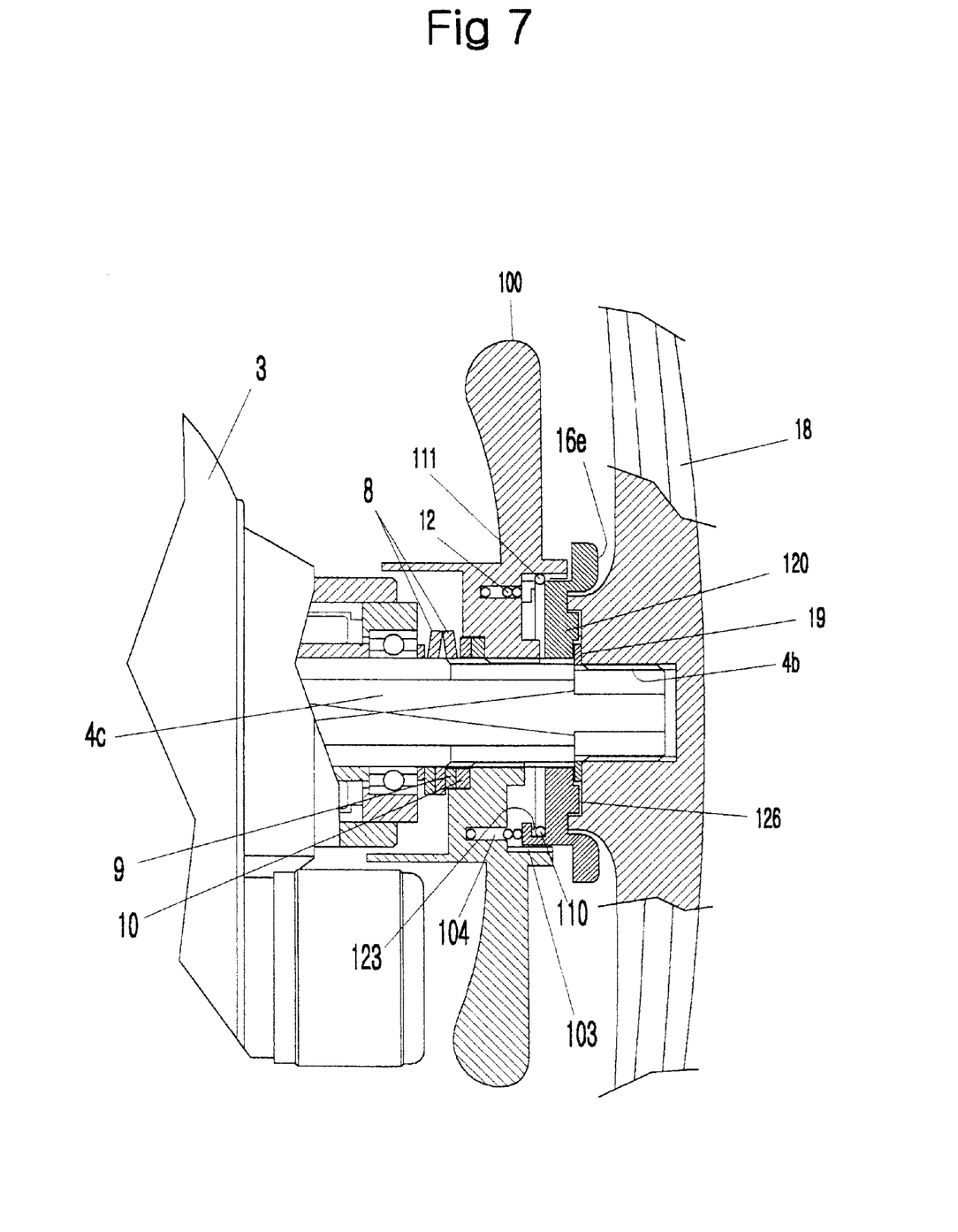
FIG. 7 is a longitudinal cross-sectional view illustrating the construction of an alternative embodiment of the present invention.

FIG. 7 is a cross-sectional view illustrating the construction of a dual-bearing reel according to an alternative embodiment of the present invention. Referring to FIG. 7, the nut 11 is omitted, the spring 12 is engaged to the drag knob 100, and the locking ring 110 having an angled retaining protrusion 111 is formed instead of the spring 13 and 14 of FIG. 6.

Also, the handle locking plate 120 may receive the locking ring 110. The angled retaining protrusion 111 of the locking ring 110 is contacted with a radial groove 103 of the drag knob 100 by that the protrusion is exposed through the cutout portion 124 of the handle locking plate 120. Thus, when the drag knob 100 is rotated, the click sound is generated by friction generated between the angled retaining portion 111 of the locking plate 110 and the radial groove 103. Here, the protrusion portion 103 is formed on the handle locking plate 120 and is inserted to the opening 18a of the handle 18. This construction can be identically applied to other embodiment.

Figure 8:
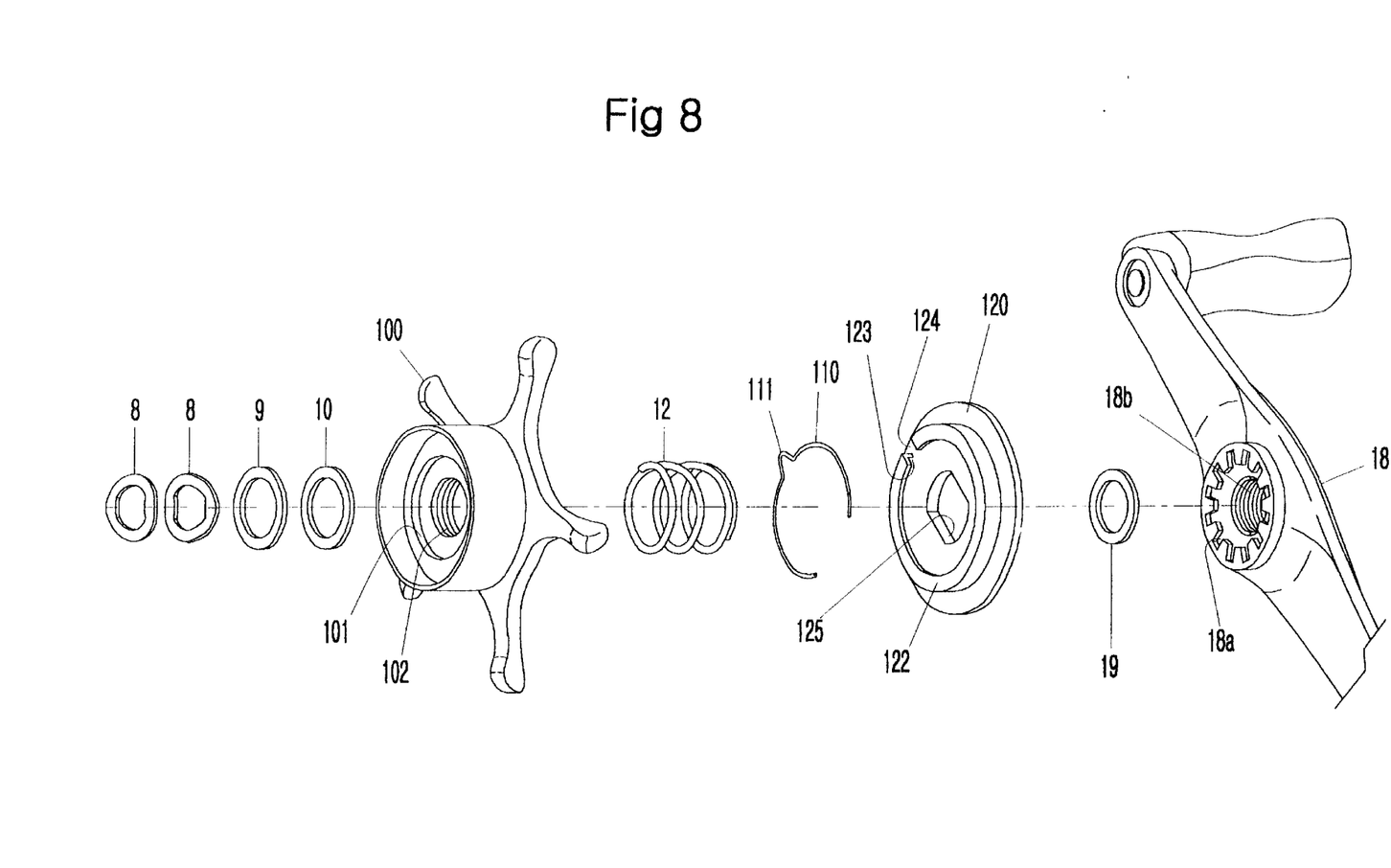
FIG. 8 is an exploded view illustrating the structure of a dual-bearing reel for fishing of FIG. 7.
Figure 12:
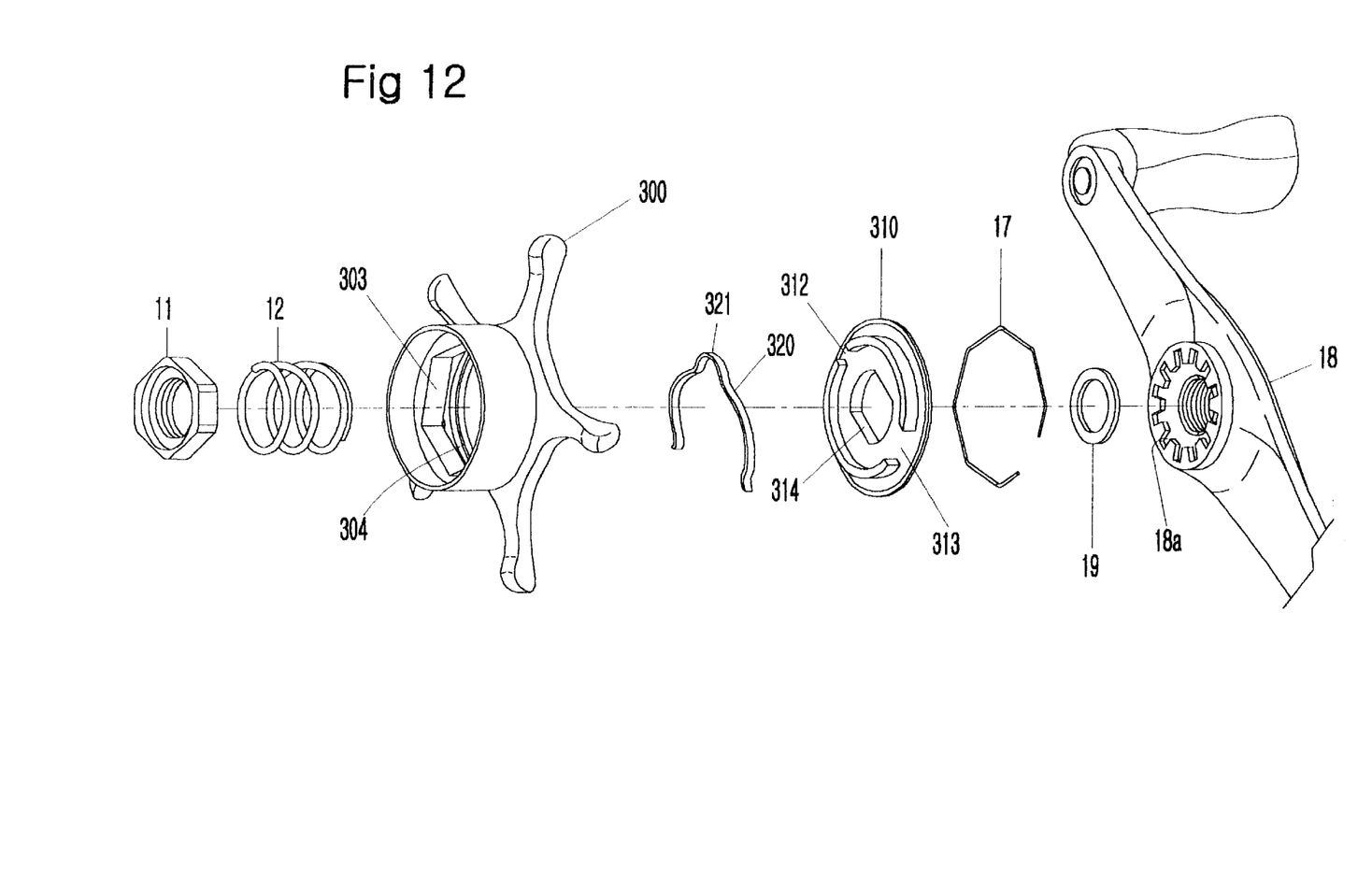
FIG. 12 is an exploded view illustrating the construction of a dual-bearing reel having a detachable handle of FIG. 11.

Meanwhile, a protrusion portion similar to the protrusion portion 103 of the handle locking plate 120 of FIG. 8 is also formed on the back plane of the locking plate 310 of FIG. 12. The protrusion portion of FIG. 12 is omitted.

Figure 9:
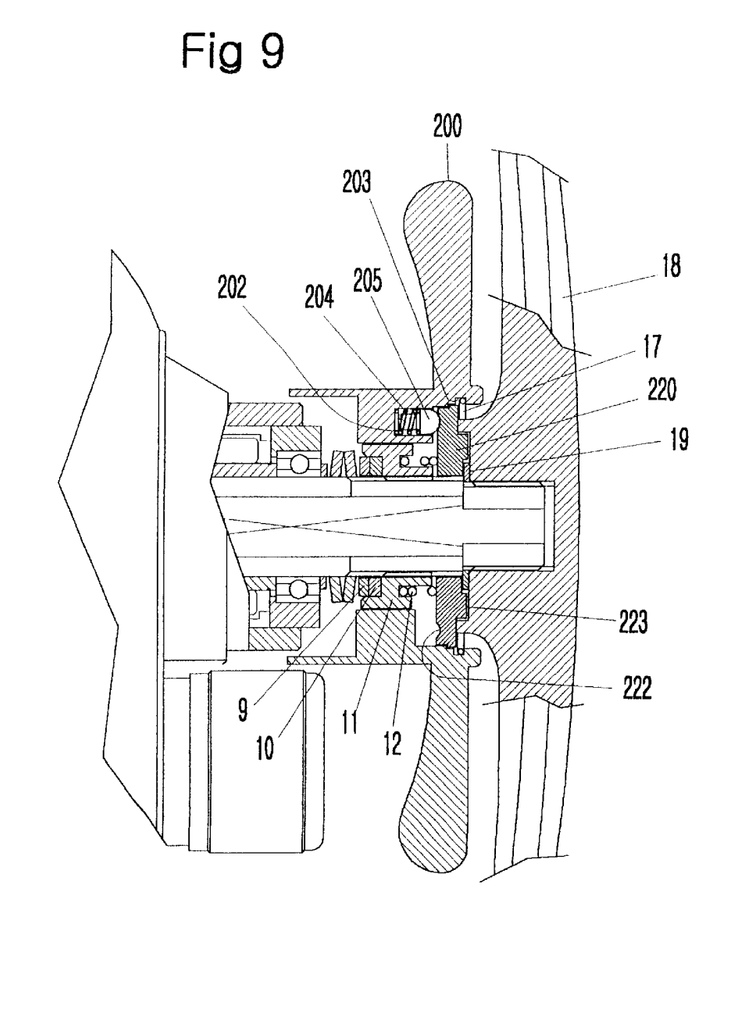
FIG. 9 is a longitudinal cross-sectional view illustrating the construction of an alternative embodiment of the present invention.
Figure 10:
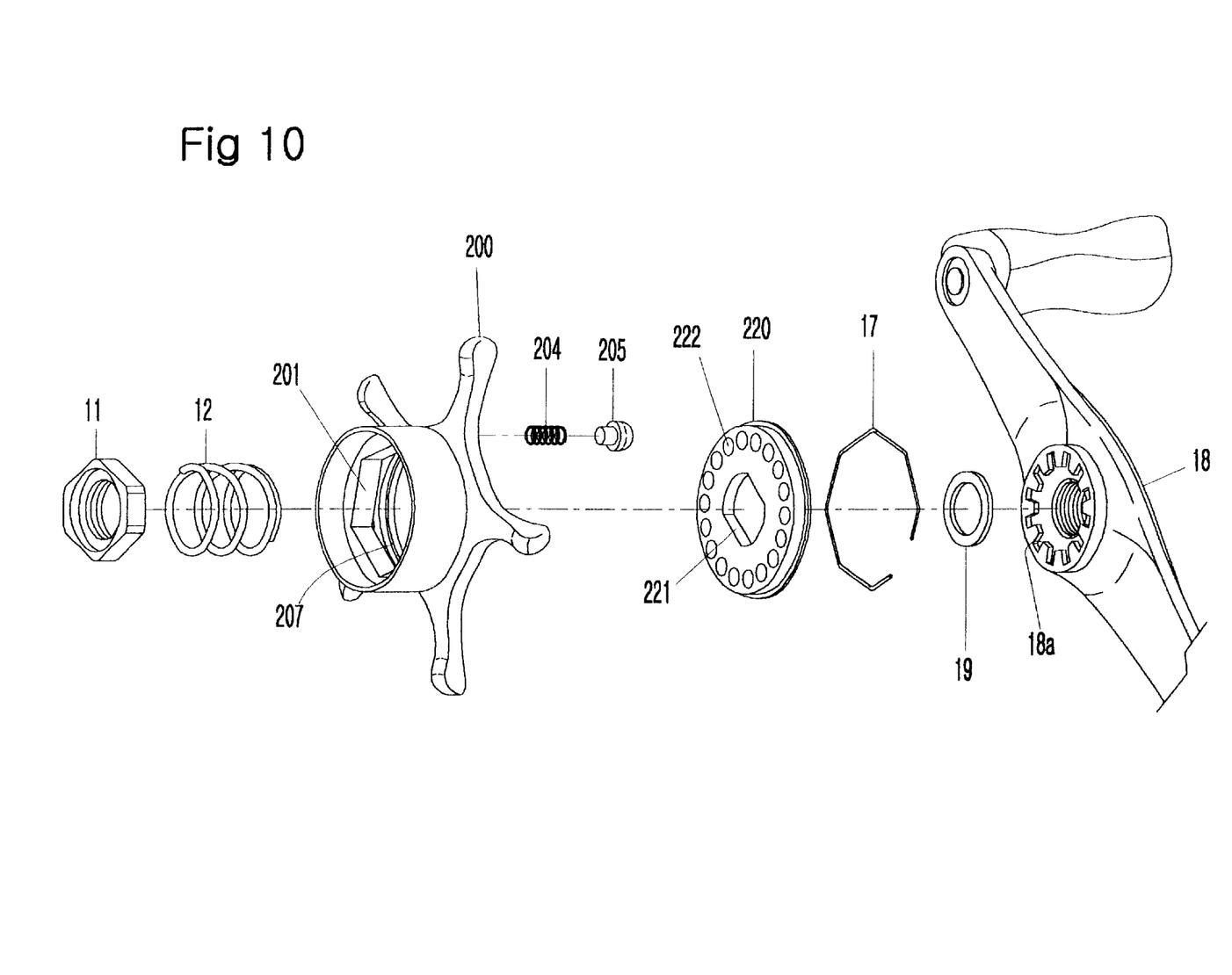
FIG. 10 is an exploded view illustrating the structure of a dual-bearing reel for fishing of FIG. 9.

FIG. 9 shows an alternative embodiment of the present invention, in which a spring 204 and a pin 205 is inserted into a hole 202 formed on a drag knob 200. A plurality of holes 222 is also formed on the handle locking plate 220. An operation with regard to the pin 205 and the hole 222 when the drag knob is rotated is similar to that of FIG. 1.

Figure 11:
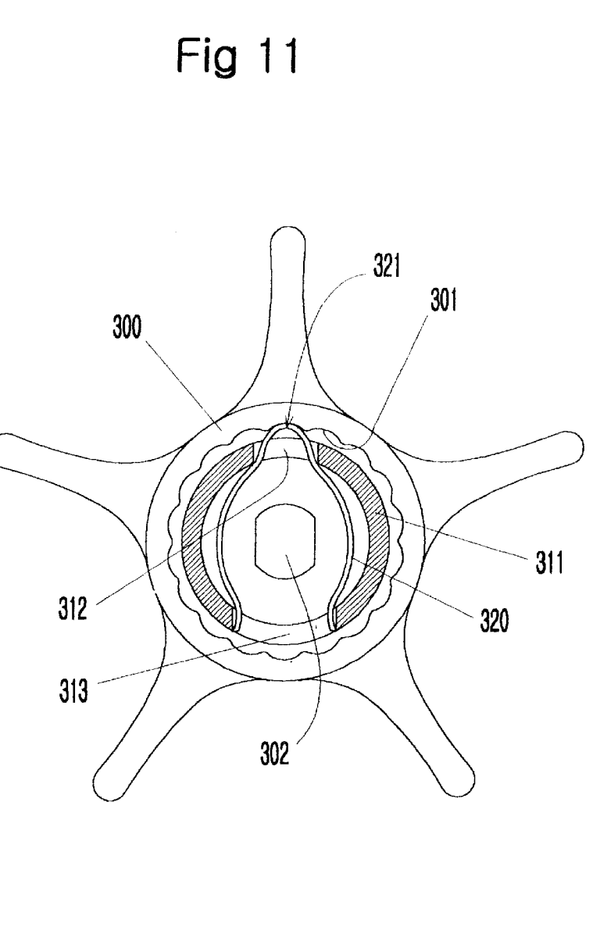
FIG. 11 is a longitudinal cross-sectional illustrating the construction of an alternative embodiment of the present invention.

FIG. 11 is an alternative embodiment of the present invention. That is, FIG. 11 is transformed from a case of the FIG. 7, in which a nut 11 is used, a locking ring 320, which include an angled retaining portion 321 having a similar function to the locking ring 110 of FIG. 8 as described above is formed. Here, a handle locking plate 310 of FIG. 12 is similar to the handle locking plate 120 of FIG. 8. Thus, this operation is also similar to an embodiment described above.

Figure 13:
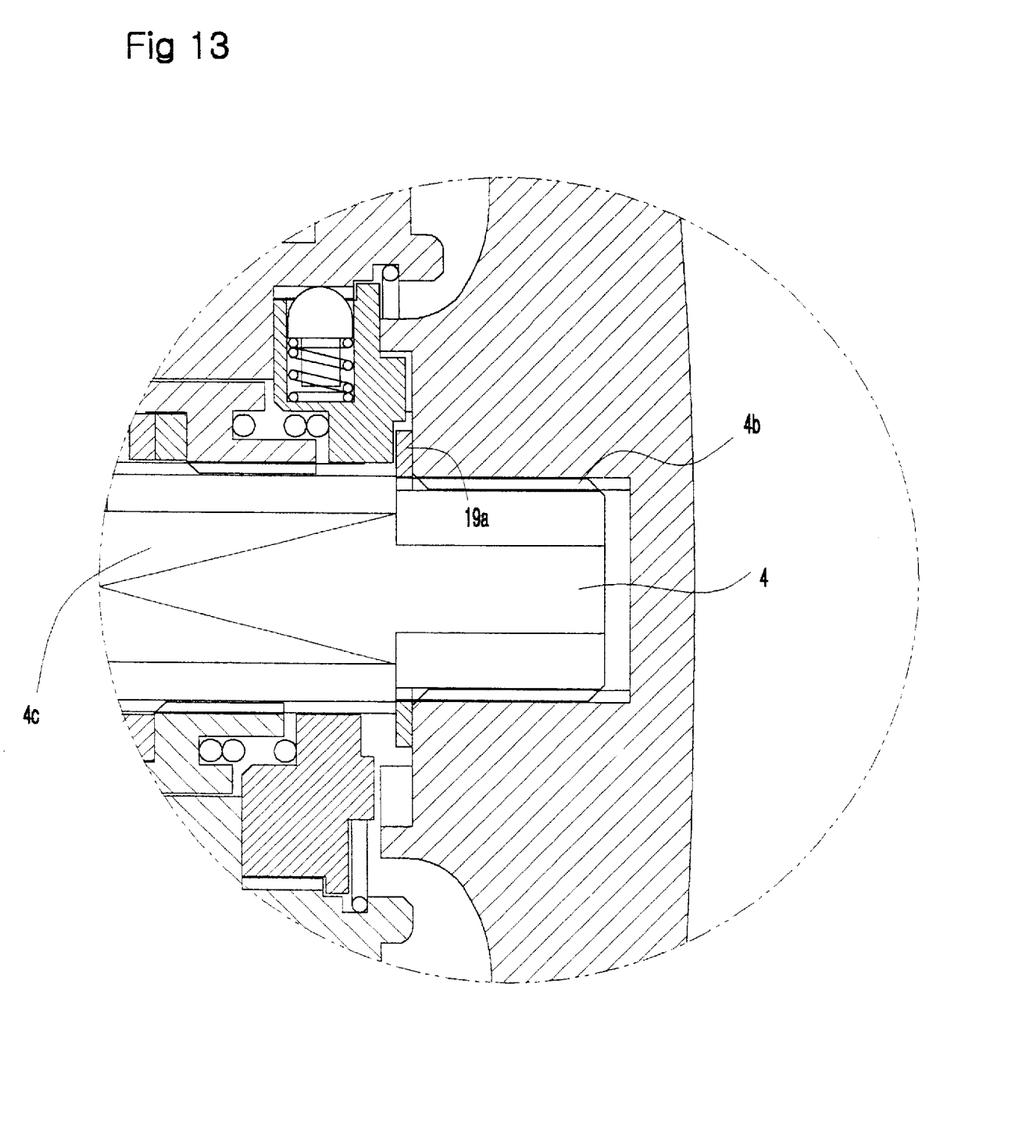
FIGS. 13 and 14 are longitudinal cross-sectional views illustrating the construction applicable embodiment of the present invention.
Figure 14:
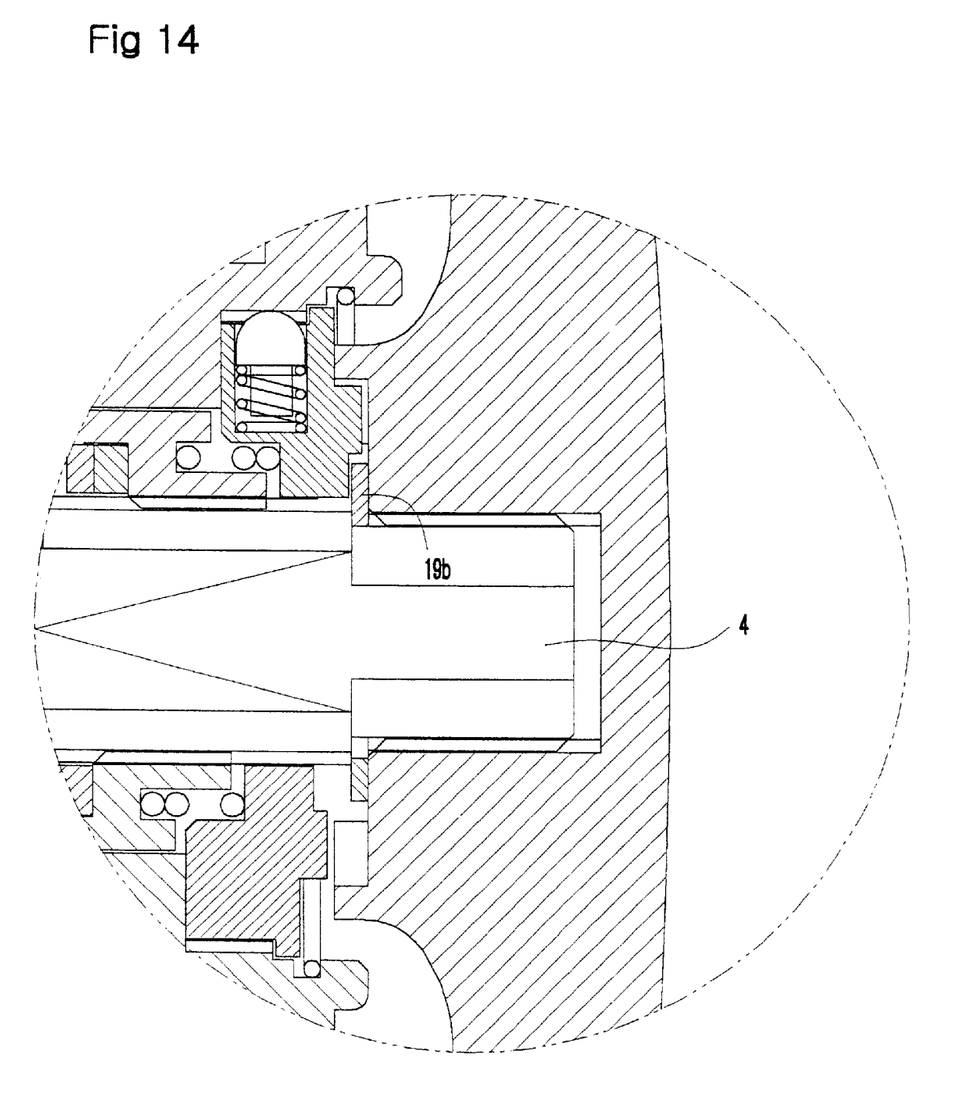

FIG. 13 shows an alternative embodiment using a washer-typed nut 19a and a snap ring 19b instead of the washer 19 of the each embodiment.

By using a washer-like nut 19a and a snap ring 19b instead of the washer 19, when the handle 18 is disengaged from the driving shaft 4, some parts assembled within the drag knob may come off on the outside in the each embodiment described above.

Accordingly, the use of the washer-typed nut 19a and a snap ring 19b according to the present invention as described above is to prevent components being consisted of the drag knob from being lost. That is, the problem described above is easily solved because the washer-typed nut 19a or the snap ring 19b is fixed to the driving shaft 4 when the handle 18 is disengaged from the handle. Also, if the snap ring 19b is used, a hole for receiving the snap ring 19b is formed on the driving shaft 4.

As described above, according to the present invention, the handle 18 can be easily disengaged from the driving shaft without using any tools. At this time, any noise doesn't happen and have no anxiety to loss of some parts. Moreover, when the drag knob is rotated, a click sound is generated.

While the present invention has been described and illustrated herein with reference to the preferred embodiments thereof, it will be understood by those skilled in the art that various changes in form and details may be made therein without departing from the spirit and scope of the present invention.

What is claimed is:

1. A dual-bearing reel having a detachable handle, comprising:
   a handle including an opening and a threaded bore, the opening having a plurality of a slots diametrically extended;
   a driving shaft having one end threaded into the threaded bore of the handle;
   a nut for maintaining a plurality of washers in a proper position of the driving shaft;
   a spring inserted into a first threaded portion of the driving shaft, for generating a biasing force;
   a drag knob having an opening for receiving the nut, a first groove for contacting with a pin, and a second groove for receiving an angled locking ring; and
   a handle locking plate positioned on the driving shaft and fixed to the drag knob by the biasing force of the spring, the plate having a hole for receiving the pin and a spring, a plurality of the stopping protrusions being inserted into the slot of the handle, and a throughout hole for receiving the driving shaft, whereby a click sound is generated by a friction between the first groove and the pin when the drag knob is rotated.

2. The dual-bearing reel having a detachable handle as recited in claim 1, further comprising: a washer-typed nut engaged to a second threaded portion of the driving shaft, for preventing components of the drag knob from being separated when the handle is disengaged from the driving shaft.

3. The dual-bearing reel having a detachable handle as recited in claim 1, further comprising: a snap ring being engaged to a second threaded portion of the driving shaft, for preventing components of the drag knob from being separated when the handle is disengaged from the driving shaft.

4. A dual-bearing reel having a detachable handle, comprising:
   a handle including an opening and a threaded bore, the opening having a plurality of slots diametrically extended;
   a driving shaft having one end threaded into the threaded bore of the handle;
   a spring inserted into a first threaded portion of the driving shaft, for generating a biasing force;
   a locking ring having an angled retaining portion, for generating sound by a friction in rotating;
   a drag knob having an opening for receiving a plurality of washer, a first groove for receiving the spring, and a second groove for receiving the angled retaining portion of the locking ring;
   a handle locking plate positioned on the driving shaft and fixed between the drag knob and the handle by the biasing force of the spring, the plate having a groove for receiving the locking ring, a protrusion portion having a cutout portion, a stopping protrusion being inserted into the opening of the handle, and a throughout hole for receiving the driving shaft, whereby a click sound is generated by a friction between the second groove and the angled retaining portion when the drag knob is rotated.

5. The dual-bearing reel having a detachable handle as recited in claim 4, further comprising: a washer-typed nut engaged to a second threaded portion of the driving shaft, for preventing components of the drag knob from being separated when the handle is disengaged from the driving shaft.

6. The dual-bearing reel having a detachable handle as recited in claim 4, further comprising: a snap ring being engaged to a second threaded portion of the driving shaft, for preventing components of the drag knob from being separated when the handle is disengaged from the driving shaft.

7. A dual-bearing reel having a detachable handle, comprising:
   a handle including an opening and a threaded bore, the opening having a plurality of slots diametrically extended;

a driving shaft having one end threaded into the threaded bore of the handle;

a nut for maintaining a plurality of washers in a proper position of the driving shaft;

a spring inserted into a first threaded portion of the driving shaft, for generating a biasing force;

a drag knob having an opening for receiving the nut, a first groove for receiving a pin and a spring, and a second groove for receiving an angled locking ring;

a handle locking plate positioned on the driving shaft and fixed to the drag knob by the biasing force of the spring, the plate having a hole for contacting with the pin and a plurality of the stopping protrusions being inserted into the opening of the handle, and a throughout hole for receiving the driving shaft, whereby a click sound is generated by a friction between the pin and the hole when the drag knob is rotated.

8. The dual-bearing reel having a detachable handle as recited in claim 7, further comprising: a washer-typed nut engaged to a second threaded portion of the driving shaft, for preventing components of the drag knob from being separated when the handle is disengaged from the driving shaft.

9. The dual-bearing reel having a detachable handle as recited in claim 7, further comprising: a snap ring being engaged to a second threaded portion of the driving shaft, for preventing components of the drag knob from being separated when the handle is disengaged from the driving shaft.

10. A dual-bearing reel having a detachable handle, comprising:

a handle including an opening and a threaded bore, the opening having a plurality of slots diametrically extended;

a driving shaft having one end threaded into the threaded bore of the handle;

a nut for maintaining a plurality of washers in a proper position of the driving shaft;

a spring inserted into a first threaded portion of the driving shaft, for generating a biasing force;

a locking ring having an angled retaining portion for generating sound in rotating;

a drag knob having an opening for receiving the nut, a first groove for contacting with the angled retaining portion, and a second groove for receiving an angled locking ring;

a handle locking plate positioned on the driving shaft and fixed between the drag knob and the handle by the biasing force of the spring, the plate having a protrusion for supporting the locking ring, a cutout portion for exposing the angled retaining portion of the locking ring, and a throughout hole for receiving the driving shaft, whereby a click sound is generated by a friction between the first groove and the angled retaining portion when the drag knob is rotated.

11. The dual-bearing reel having a detachable handle as recited in claim 10, further comprising; a washer-typed nut engaged to a second threaded portion of the driving shaft, for preventing components of the drag knob from being separated when the handle is disengaged from the driving shaft.

12. The dual-bearing reel having a detachable handle as recited in claim 10, further comprising: a snap ring being engaged to a second threaded portion of the driving shaft, for preventing components of the drag knob from being separated when the handle is disengaged from the driving shaft.

* * * * *